Patented July 31, 1951

2,562,194

UNITED STATES PATENT OFFICE 2,562,194

AMINOMETHYL-KETO-STEROIDS AND
PROCESS OF PREPARING

Percy L. Julian, Maywood, and Edwin W. Meyer
and Helen C. Printy, Chicago, Ill., assignors to
The Glidden Company, Cleveland, Ohio, a corporation of Ohio No Drawing. Application May 22, 1947,
Serial No. 749,886

17 Claims. (Cl. 260—397.4)

The present invention relates to new amines of the steroid series and their preparation. Specifically it relates to aminomethyl derivatives of keto-steroids, said derivatives characterized by the grouping —CH$_2$—N<.

These amines give hydrochlorides which are partially water soluble and may therefore prove to be oral preparations of therapeutic value. Also these amines serve as valuable intermediates for the preparation of compounds of definite therapeutic activity.

Now we have found a process for preparing the new amines referred to above. It consists in subjecting keto-steroids to the so-called Mannich reaction, which reaction comprises treatment with formaldehyde and an amine under appropriate conditions. This reaction may be illustrated by the following equation:

$$\underset{R''}{\overset{R'}{\diagdown}}\text{CHCOR} + \text{CH}_2\text{O} + \text{HN}\underset{R''''}{\overset{R'''}{\diagdown}} \longrightarrow \underset{R''}{\overset{R'}{\diagdown}}\text{C—COR} + \text{H}_2\text{O}$$
$$\overset{|}{\underset{\overset{|}{\text{CH}_2\text{—N}}}{}}\underset{R''''}{\overset{R'''}{\diagdown}}$$

where
R is an organic hydrocarbon or substituted hydrocarbon radical and
R', R'', R''', R'''' may be hydrogen or hydrocarbon radicals. In the case of the ketones and the amines, the carbonyl group as well as the nitrogen atom may be part of a cyclic system, such as in cyclohexanone and piperidine, respectively.

The process allows the preparation of alpha aminomethylketones of the steroid series and may be illustrated by the following two equations, employing typical steroid ketones like dehydroisoandrosterone and Δ$^5$-pregnen-3-ol-20-one.

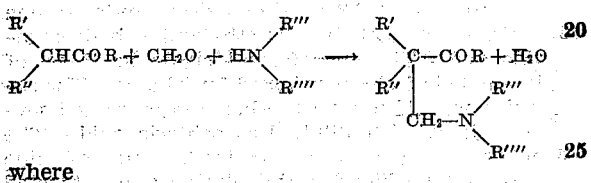

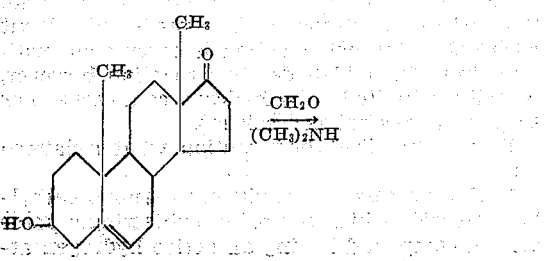

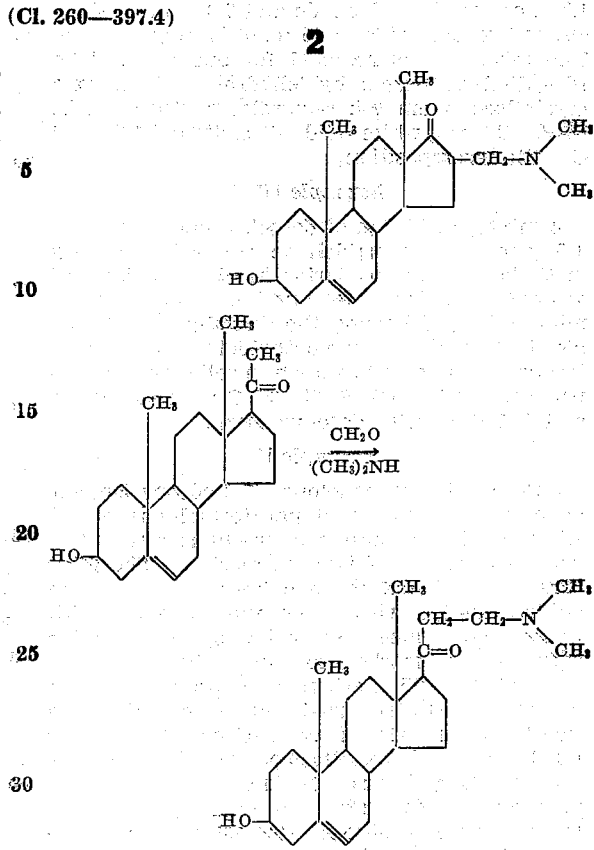

The following examples illustrate the invention.

Example I

A mixture of 2.88 g. of dehydroisoandrosterone, 1.5 g. of paraformaldehyde and 5.0 g. of anhydrous dimethylamine hydrochloride in 25 cc. of isoamyl alcohol was refluxed for two hours. During this period a solid separated and frequent swirling was necessary to keep it suspended. After chilling overnight, the mixture was diluted with ether and extracted with dilute aqueous hydrochloric acid. The acidic aqueous layer containing suspended solid material was separated and made alkaline with saturated sodium carbonate solution. The aqueous mixture was then exhaustively extracted with ether. The ether extract was washed with water, dried and concentrated. From the concentrated ethereal solution a white solid crystallized. The solid weighed 2.5 g. and melted at 158–168° C. with decomposition. Recrystallization from ether-petroleum ether (B. P. 35–60° C.) gave pure 16-dimethylaminomethyldehydroisoandrosterone as needles which melted at 173–174.5° C. with decomposition.

Example II

A mixture of 2.88 g. of dehydroisoandrosterone, 1.5 g. of paraformaldehyde and 8.3 g. of piperidine hydrochloride in 25 cc. of isoamyl alcohol was refluxed for one hour. The mixture was then worked up as described in Example I. The 16 - piperidino - methyldehydroisoandrosterone crystallized from an ether-petroleum ether (B. P. 35–60° C.) solution as a white solid which melted at 168–170° C. with decomposition.

Example III

According to the procedure of Example I, 2.88 g. of dehydroisoandrosterone was treated with 1.5 g. of paraformaldehyde and 7.0 g. of diethylamine hydrochloride in 25 cc. of isoamyl alcohol. The mixture was refluxed for one hour. The 16 - diethylaminomethyldehydroisoandrosterone crystallized from ether-petroleum ether (B. P. 35–60° C.) as a white solid. It melted at 135–140° C. with decomposition.

Example IV

A mixture of 5.7 g. of dehydroisoandrosterone, 1.5 g. of paraformaldehyde and 8.5 g. of dry methylamine hydrochloride in 50 cc. of isoamyl alcohol was refluxed for one hour and forty-five minutes. By following the directions of Example I, 16-methylaminomethyldehydroisoandrosterone was obtained as a white solid from ether-petroleum ether (B. P. 35–60° C.) which melted at 133–140° C. with decomposition.

Example V 3.16 g. of pregnenolone (3-hydroxy-5-pregnene-20-one), 0.75 g. of paraformaldehyde and 2.0 g. of dimethylamine hydrochloride was suspended in 25 cc. of isoamyl alcohol. The mixture was refluxed for one hour. It was then chilled, diluted with ether and extracted with water. The aqueous extract was made alkaline with sodium bicarbonate solution and extracted with ether. The ethereal solution was then washed with water, dried and concentrated to a small volume. On addition of petroleum ether (B. P. 35–60° C.) to the concentrated solution, 2.10 g. of crystalline 21-dimethylaminomethylpregnenolone separated. It melted at 122–128° C. with decomposition. Recrystallization from ether-petroleum ether gave prisms melting at 125–131° C. dec.

Example VI

A mixture of 3.14 g. of progesterone, 0.75 g. of paraformaldehyde and 1.0 g. of dimethylamine hydrochloride was refluxed for two hours. The clear, yellow solution was chilled, diluted with ether and extracted with water. The aqueous extract was made alkaline with sodium bicarbonate solution and extracted with ether. The ether extract was then washed with water and dried. The product remained, after removal of solvent, as an amorphous mass. Its hydrochloride was soluble in water.

Example VII

Testosterone, 2.9 g., was dissolved in 25 cc. of isoamyl alcohol containing 1.5 g. of paraformaldehyde and 5.0 g. of dimethylamine hydrochloride. The solution was refluxed for one and one-half hours. The cold, orange solution was diluted with ether and extracted several times with water. The combined aqueous extracts were made alkaline with dilute sodium carbonate solution and extracted with ether. The ethereal solution was washed several times with water, dried and concentrated. There remained an amorphous solid. This product formed a water soluble hydrochloride.

Example VIII

A mixture of 2.9 g. of 3-hydroxy-etioallocholanone, 1.5 g. of paraformaldehyde and 5.0 g. of dimethylamine hydrochloride in 25 cc. of isoamyl alcohol was refluxed for two hours. During this period a crystalline solid separated. The mixture was then worked up as described in Example I. The product, 2.4 g. of 16-dimethylaminomethyl - 3 - hydroxyetioallocholane - 17-one was crystallized from ether-petroleum ether (B. P. 35–60° C.) It melted at 130–133° C. with decomposition. After recrystallization from ether-petroleum ether it melted at 148–150° C. decomposition.

Example IX

Estrone, 0.135 g., 0.75 g. of paraformaldehyde and 0.29 g. of dimethylamine hydrochloride were dissolved in 6 cc. of isoamyl alcohol. The solution was refluxed 2 hours and chilled overnight. It was then diluted with ether and extracted with dilute hydrochloric acid. The acidic aqueous solution was made alkaline with sodium bicarbonate and extracted with ether. The product was obtained by concentration of the washed and dried ethereal solution and crystallization from petroleum ether (B. P. 35–60° C.). It melted at 125–128° C. with decomposition.

Example X

A mixture of 3.3 g. of dehydroisoandrosterone acetate, 1.0 g. of dry dimethylamine hydrochloride and 0.75 g. paraformaldehyde in 25 cc. of isoamyl alcohol was refluxed for 2 hours. The solution was diluted with ether and extracted several times with dilute hydrochloric acid. The acidic extracts were combined, made alkaline with sodium bicarbonate solution and extracted with ether. The ethereal solution was washed several times with water and dried. The product, crude 16-dimethylaminomethyldehydroisoandrosterone acetate, was crystallized by the addition of petroleum ether (B. P. 35–60° C.) to the concentrated ether solution. It melted at 128–132° C.

It is to be understood that the foregoing examples are merely illustrative of preferred procedures. Thus dimethyl-amine is a preferred amine since, in accordance with its known reactivity in the Mannich reaction, it leads to excellent yields, but other amines containing a hydrogen attached to the nitrogen may be used. Similarly isoamyl-alcohol is a preferred solvent where the Mannich reaction is carried out with anhydrous formaldehyde. The reaction, however, is neither limited to anhydrous conditions, nor to isoamyl alcohol as a solvent.

Having described the invention, what is claimed is:

1. The process for producing α-aminomethyl-keto-steroids which comprises subjecting a keto-steroid compound having an active hydrogen atom attached to a carbon atom alpha to the carbonyl group selected from the class consisting of 3-keto-steroids, 17-keto steroids and 20-keto-steroids to a Mannich reaction.

2. The process of claim 1 in which the amine used in the Mannich reaction is a di-alkyl-amine.

3. The process of claim 1 in which the amine used in the Mannich reaction is di-methyl-amine.

4. The process for producing 16-aminomethyl-17-keto-steroids which comprises subjecting a 17-keto-steroid having an active hydrogen atom attached to a carbon atom alpha to the carbonyl group to a Mannich reaction.

5. The process for producing 21-aminomethyl-20-keto-steroids which comprises subjecting a 20-keto-steroid having an active hydrogen atom attached to a carbon atom alpha to the carbonyl group to a Mannich reaction.

6. The process which comprises subjecting dehydroisoandrosterone to a Mannich reaction.

7. The process which comprises subjecting a 20-keto-pregnene compound to a Mannich reaction.

8. The process which comprises subjecting $\Delta^5$-pregnenol-3-one-20 to a Mannich reaction.

9. 16 - dimethylaminomethyldehydroisoandrosterone.

10. 21 - dimethylaminomethyl - $\Delta^5$ - pregnenol-3-one-20.

11. Compounds of the steroid series having a keto-group in the 17-position and a lower alkyl-aminomethyl group in the 16-position.

12. A 16-lower alkylaminomethyl dehydroisoandrosterone.

13. Compounds of the steroid series having a keto-group in the 20-position, and a lower alkyl-aminomethyl group in the 21-position.

14. A 21-lower alkylaminomethyl-20-keto-3-hydroxy-$\Delta^5$-pregnene.

15. The $\alpha$-aminomethyl-keto-steroids selected from the class consisting of 16-aminomethyl-17-keto-steroids and 21-aminomethyl 20-keto steroids in which the aminomethyl group possesses the structure

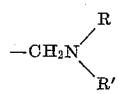

wherein R and R' together represent groupings selected from the class consisting of (1) hydrogen and a lower alkyl group, (2) two lower alkyl groups and (3) a lower alkylene group.

16. The 17-keto-16-aminomethyl compounds of claim 15 in which R and R' together is a lower alkylene group.

17. The 17-keto-16-aminomethyl compounds of claim 15 in which R and R' together is a pentamethylene group.

PERCY L. JULIAN.
EDWIN W. MEYER.
HELEN C. PRINTY.

REFERENCES CITED

The following references are of record in the file of this patent:

Adams: Organic Reactions, vol. 1, pp. 303-341 (1942).